Sept. 14, 1937.   J. H. LOVE   2,093,201
WINDOW OPERATING MEANS
Filed June 30, 1936   3 Sheets-Sheet 3

Inventor
J. H. Love

By Clarence A. O'Brien and
Hyman Berman
Attorneys

Patented Sept. 14, 1937

2,093,201

UNITED STATES PATENT OFFICE 2,093,201

WINDOW OPERATING MEANS

John H. Love, Oliver Springs, Tenn.

Application June 30, 1936, Serial No. 88,217

2 Claims. (Cl. 268—20)

The present invention relates to new and useful improvements in window operating means particularly for motor vehicles and has for one of its important objects to provide, in a manner as hereinafter set forth, an apparatus of this character embodying a novel construction and arrangement through the medium of which the windows may be raised to closed position by fluid pressure.

Another very important object of the invention is to provide a fluid operated window operating means particularly for motor vehicles embodying a construction and arrangement which is such that any or all of the windows of the vehicle may be conveniently closed by the operator sitting in his seat.

Other objects of the invention are to provide a fluid operated window operating means of the character described which will be comparatively simple in construction, strong, durable, highly efficient and reliable in use, compact, and which may be manufactured and installed at low cost.

All of the foregoing and still further objects and advantages of the invention will become apparent from a study of the following specification, taken in connection with the accompanying drawings wherein like characters of reference designate corresponding parts throughout the several views, and wherein: —

Figure 1:
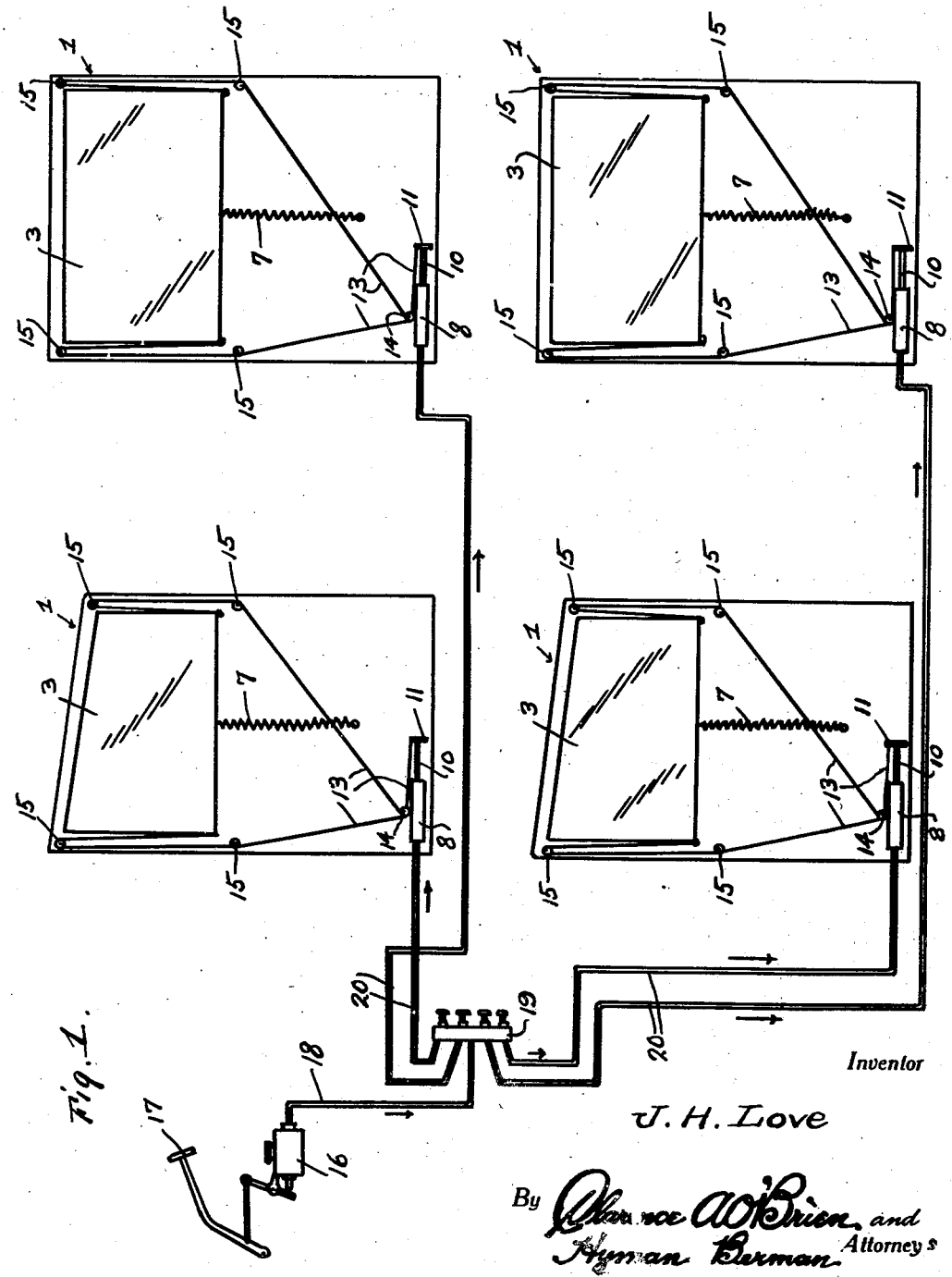
Figure 1 is a diagrammatic view of the fluid system constituting a part of the present invention.
Figure 2:
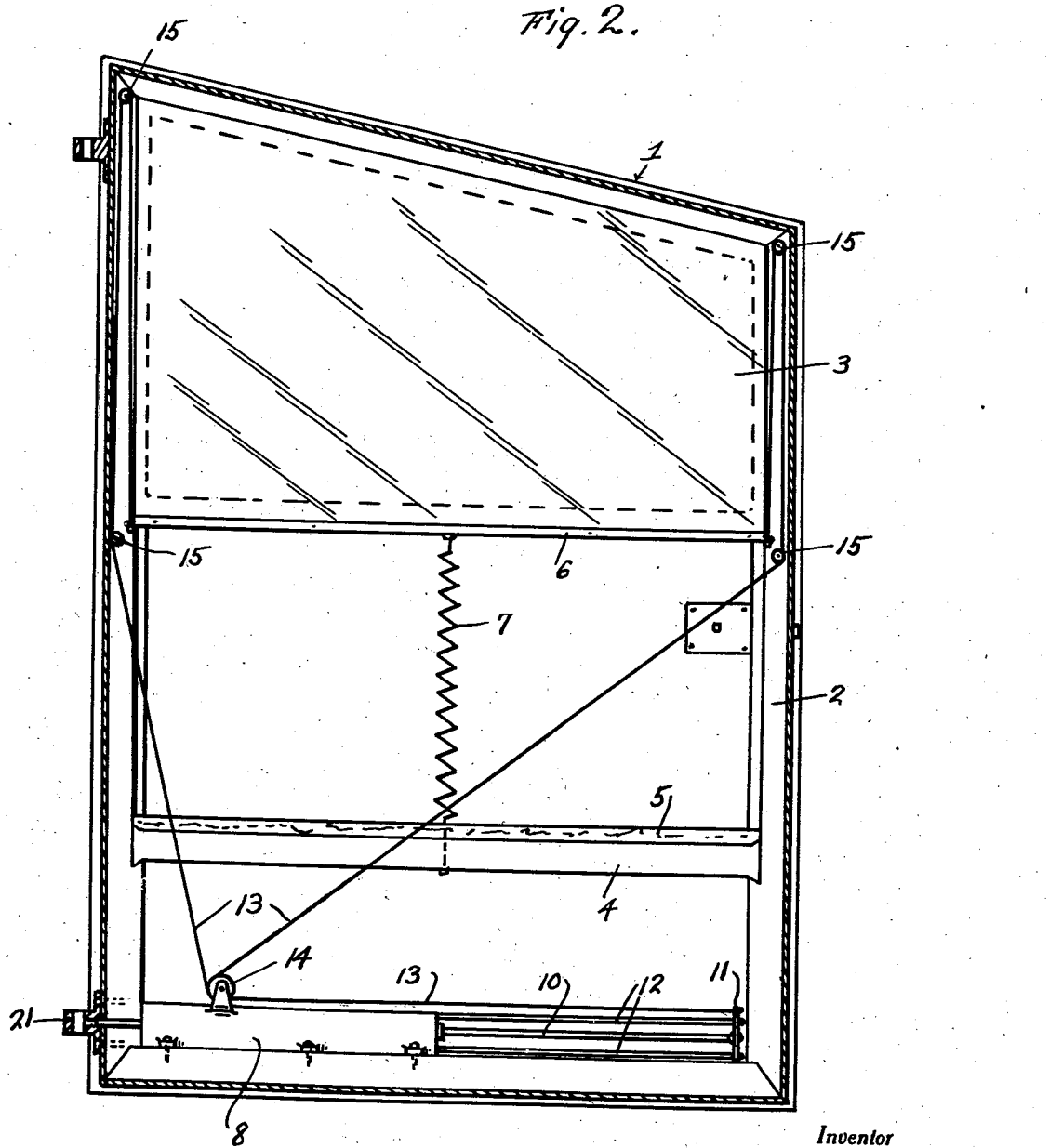
Figure 2 is a view in vertical section through an automobile door equipped with the invention.

Referring now to the drawings in detail, it will be seen that the reference numeral 1 designates generally an automobile door comprising a frame 2 in which a glass 3 is mounted for vertical sliding movement. Beneath the glass 3 a bar 4 extends horizontally in the frame 2 and mounted on said bar is a rubber cushion 5 on which the glass rests when in lowered or open position. The glass 3 has mounted horizontally on its lower edge a metallic bar 6. A spring 7 has one end connected to the bar 4 and its other end connected to the bar 6 for pulling downwardly on the glass 3.

Figure 3:
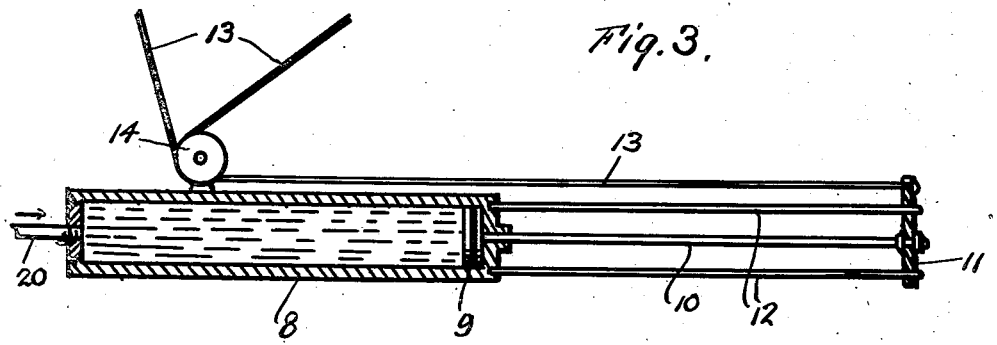
Figure 3 is a view in vertical longitudinal section through one of the fluid actuated glass operating units.
Figure 4:
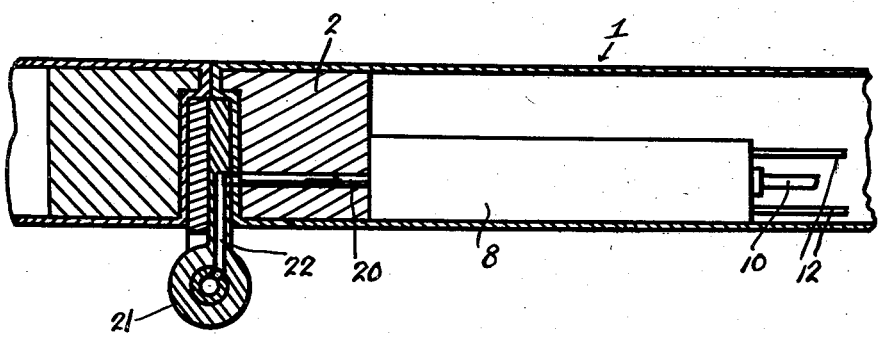
Figure 4 is a view in horizontal section through a portion of a door and the adjacent portion of the body or frame, showing the fluid passage through one of the door hinges.
Figure 5:
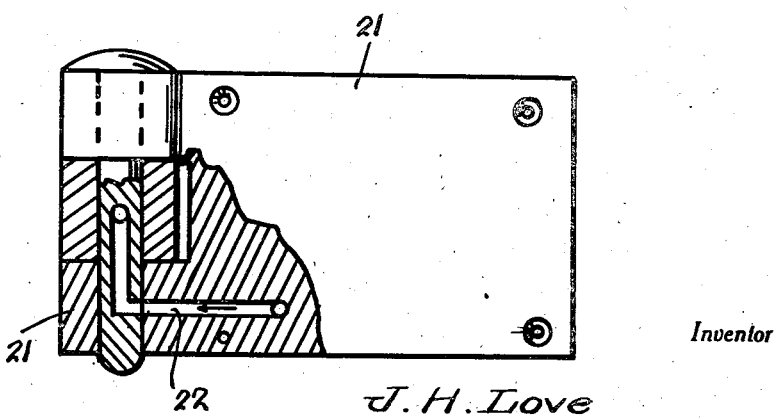
Figure 5 is a detail view of a hinge partially in elevation and partially in section, showing the fluid passage therethrough.

Mounted horizontally on the bottom of the door frame 2 is a cylinder 8 in which a fluid actuated piston 9 (see Figure 3) is mounted for reciprocation. Fixed to the piston 9 and extending slidably through one end of the cylinder 8 is a rod 10 having mounted on its outer end a head 11. Projecting from said one end of the cylinder 8 are guides 12 on which the head 11 is slidable. Cables 13 are connected, at one end to the head 11 for actuation by the piston 9. The cables 13 are trained over a pulley 14 on the cylinder 8 and over pulleys 15 in the door frame 2 and have their other ends connected to the ends of the bar 6 for elevating the glass 3 against the tension of the spring 7 when the piston 9 is moved to the position shown in Figure 3 of the drawings.

Referring now to Figure 1 of the drawings, it will be seen that the reference numeral 16 designates a fluid pump which is actuated by a foot lever 17, said foot lever 17 being within convenient reach of the operator of the vehicle. A conduit 18 connects the pump 16 to a multiple valve unit 19 which may be mounted, for example, on the instrument board of the vehicle. Conduits 20 extend from the valves of the unit 19 to the windows of the vehicle. The doors 1 are mounted on hinges 21 having fluid passages 22 therein with which the conduits 20 and the cylinders 8 communicate.

It is thought that the operation of the apparatus will be readily apparent from a consideration of the foregoing. If the operator of the vehicle wishes to close all of the windows simultaneously, the several valves comprising the unit 19 are opened and the foot lever 17 is operated for forcing fluid under pressure from the pump 16 through said unit 19 to the cylinders 8 for lifting all of the glasses 3. Of course, if the operator wishes to close but one window the desired valve of the unit 19 is opened. The windows are maintained in closed position by closing the valves of the unit 19. To permit the springs 7 to open the windows, the valves of the unit 19 are again opened to allow the fluid to return to the pump 16 from the cylinders 8.

It is believed that the many advantages of a window operating mechanism constructed in accordance with the present invention will be readily understood, and although a preferred embodiment of the apparatus is as illustrated and described, it is to be understood that changes in the details of construction and in the combination and arrangement of parts may be resorted to which will fall within the scope of the invention as claimed.

What is claimed is:—

1. A window operating means of the class described comprising, in combination, a door including a frame, a window mounted for vertical sliding movement in said frame, a horizontal bar mounted in the frame below the window, a cushion mounted on said bar and engageable by the window, a bar mounted on the lower edge of the window, a coil spring having one end connected to the first-named bar and its other end connected to the second-named bar for yieldingly urging the window downwardly, pulleys mounted in the frame, a cylinder mounted in the frame below the first-named bar, a piston slidable in said cylinder, a rod connected to the piston and extending slidably through one end of the cylinder, guides projecting longitudinally from said one end of the cylinder, a plate mounted on the outer end of the rod and slidable on the guides, means for forcing a fluid into the cylinder for actuating the piston, and cables trained over the pulleys and connected, at one end, to the end portions of the second-named bar and at their other ends to the plate.

2. A window operating means for motor vehicles comprising, in combination, a door including a frame, supporting hinges for said door, one of said hinges having a fluid passage therein, a glass mounted for vertical sliding movement in the frame, pulleys mounted in said frame, a bar mounted horizontally in the frame below the glass, a cushion mounted on said bar for engagement by the frame, a coil spring having one end connected to the bar and its other end connected to the glass for yieldingly urging the glass downwardly in the frame, a cylinder mounted in the lower portion of the frame and communicating with the fluid passage in said one hinge, a fluid actuated piston slidably mounted in the cylinder, a rod connected to said piston and extending slidably through one end of the cylinder, guides projecting longitudinally from said one end of the cylinder, a plate fixed on the rod and slidable on the guides, a pulley mounted on the cylinder, cables trained over the first and second-named pulleys and connected, at one end, to the plate and at their other ends to the glass for raising said glass to closed position against the tension of the spring, a manually operable fluid pump, conduits connecting said pump to the fluid passage in said one hinge, and a valve interposed in said conduits for controlling the passage of the fluid from the pump to said one hinge.

JOHN H. LOVE.